Jan. 14, 1930.  V. F. GRACE  1,743,131
BUBBLE TOWER BAFFLE PLATE
Filed Oct. 3, 1927
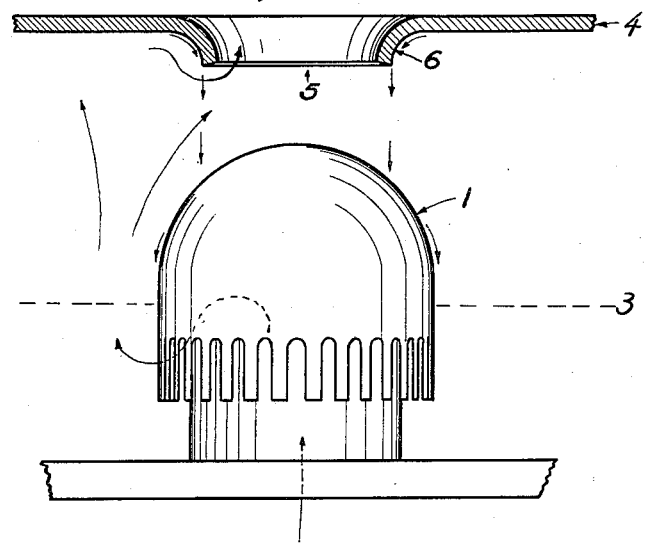
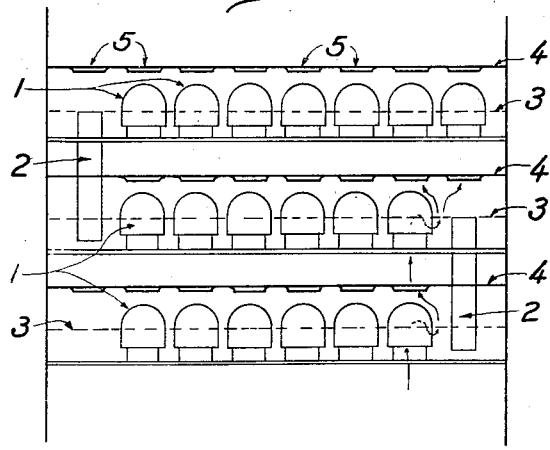
Victor F. Grace
INVENTOR Patented Jan. 14, 1930

1,743,131

UNITED STATES PATENT OFFICE

VICTOR F. GRACE, OF LOS ANGELES, CALIFORNIA

BUBBLE-TOWER BAFFLE PLATE

Application filed October 3, 1927. Serial No. 223,662.

A dephlegmator is a device for fractionating the vapors of liquids more closely and rapidly than can be done by simple distillation. Many types of dephlegmators are in use but the operating principle of all is substantially the same. The vapor evolved from the still is slightly cooled, causing its least volatile elements to condense, this condensate remaining partly suspended in the remaining vapor in the form of a fog or mist. This mist is then removed by scrubbing the vapor with collected quantities of the condensate which coalesces the mist particles, while at the same time any lighter elements which may have condensed with the heavy ends are re-evaporated therefrom.

In the certain type of dephlegmator known as the bubble tower the condensate is collected in shallow pans or trays arranged in a stack in a tall, narrow shell. The condensate flows downward from pan to pan, finally draining out at the bottom, while the vapor passes upwardly through upwardly projecting nozzles fixed in the bottoms of the pans, and underneath the submerged edges of bell-shaped caps set over such nozzles. The vapors are thus forced below the surface of the layer of liquid retained in each pan, and are repeatedly subdivided and scrubbed with the hot condensate. This is all current practice and very well known and understood.

Theoretically these vapors bubble up smoothly and evenly through the liquid layers, but because of variations in rate of vapor flow and other causes there is often, if not always, considerable agitation and splashing on the pans by which the condensate, which is supposed to pass downward only, is projected upward into the overlying nozzles, and is thus carried upward from tray to tray, materially reducing the effectiveness of the device.

I have discovered that by interposing between the bubble pans a perforated baffle plate, the condensate splashings are projected against the lower side of this plate, from which they may be caused to drip downward instead of being carried up to the next pan. The interposed surface, wet with condensate, is also highly effective in coalescing the mist carried in the vapors and reducing it to a liquid body, and the action of the dephlegmator as a separating means is thus increased.

I have also discovered that if these baffle plates have plain perforations through the flat metal, the upward velocity of the vapors through these perforations will carry the condensate upward, while if the edges of the perforations be turned downward as shown in the attached drawing, the condensate collecting on either face of the plate will pass to the nearest perforation and drip from the down-turned edge into the pan below, in which it systematically belongs. In the attached drawings, which are strictly diagrammatic Figure 1 represents a single bubble cap and a single perforation of my improved type immediately thereover.

Figure 2 represents a section of a bubble tower showing three bubble pans with my improved plate over each.

Referring to Figure 2, the numerals 1—1—1 etc. indicate bubble caps of any preferred type, as for instance those shown on a larger scale in Figure 1. 2—2 are the customary down-flow pipes by which the liquid levels 3—3 are maintained, any excess condensate flowing downward through a pipe 2 to the pan below. 4—4 are my improved baffle plates in position between the pans, and 5—5—5 etc., are my improved perforations therethrough.

Referring to Figure 1, 6 is the down-turned edge of the perforation, the depth of this depression being not less than the thickness of the plate and preferably about one-fourth the diameter of the hole.

In these drawings the upturned arrows indicate the general direction of flow of the vapors and entrained mist, while the down-turned arrows indicate the direction of flow of such liquids as are projected against or separated by contact with the baffle plate.

The area of the perforations 5 may be substantially equal to the area of the vapor-nozzles between the bubble caps. Or the combined area of the perforations in each plate may be such that the velocity of the vapors passing therethrough will not be materially higher than five lineal feet per second, as at higher velocities there is a tendency for the liquids collecting on the lip of the perforation to be whipped off and carried upward with the vapor instead of dripping downward.

It is also desirable to interpose the perforated plates about midway between the pans, though this is not essential. The distances between the pans will be governed by their diameter and other considerations with which I am not here concerned.

I claim as my invention:

1. In a bubble tower dephlegmator; a splash plate interposed between a pair of bubble plates, vapor rises on said plates each surmounted by a bubble cap, said splash plate having a perforation located substantially over each bubble cap in the bubble plate next below and being otherwise substantially vapor tight.

2. In a bubble tower dephlegmator; a perforated splash plate interposed between a pair of bubble plates, vapor rises on said plates each surmounted by a bubble cap, the perforations in said plate having downturned edges and being located directly over the bubble caps in the bubble plate next below.

In witness that I claim the foregoing I have hereunto subscribed my name this 22 day of September, 1927.

VICTOR F. GRACE.